(12) United States Patent
Gökay

(10) Patent No.: US 12,471,793 B2
(45) Date of Patent: Nov. 18, 2025

(54) METHOD FOR CHECKING A PPG SENSOR OF A HEARING APPARATUS, AND HEARING APPARATUS SYSTEM

(71) Applicant: Sivantos Pte. Ltd., Singapore (SG)

(72) Inventor: Umut Gökay, Mainz (DE)

(73) Assignee: Sivantos Pte. Ltd., Singapore (SG)

( * ) Notice: Subject to any disclaimer, the term of this patent is extended or adjusted under 35 U.S.C. 154(b) by 657 days.

(21) Appl. No.: 17/887,652

(22) Filed: Aug. 15, 2022

(65) Prior Publication Data

US 2023/0047303 A1 Feb. 16, 2023

(30) Foreign Application Priority Data

Aug. 13, 2021 (DE) .................. 10 2021 208 928.3

(51) Int. Cl.
*A61B 5/024* (2006.01)
*A61B 5/00* (2006.01)
*H04R 25/00* (2006.01)

(52) U.S. Cl.
CPC ...... *A61B 5/02433* (2013.01); *A61B 5/02416* (2013.01); *A61B 5/02438* (2013.01); *A61B 5/6817* (2013.01); *H04R 25/30* (2013.01); *H04R 25/602* (2013.01); *H04R 2225/31* (2013.01)

(58) Field of Classification Search
CPC .......... A61B 5/02433; A61B 5/02416; A61B 5/02438; A61B 5/6817; H04R 25/30; H04R 25/602; H04R 2225/31
See application file for complete search history.

(56) References Cited

U.S. PATENT DOCUMENTS

| | | | |
|---|---|---|---|
| 9,014,405 B2 | 4/2015 | Larsen et al. | |
| 10,682,082 B2 | 6/2020 | Jelfs et al. | |
| 11,553,284 B2* | 1/2023 | Antonsen | H04R 25/554 |
| 2007/0286429 A1* | 12/2007 | Grafenberg | H04R 25/30 |
| | | | 381/60 |
| 2020/0297215 A1 | 9/2020 | Cho et al. | |
| 2022/0174432 A1 | 6/2022 | Silberzahn et al. | |
| 2022/0295199 A1* | 9/2022 | Kuipers | H04R 25/65 |
| 2022/0345835 A1 | 10/2022 | Flanagan et al. | |
| 2022/0408199 A1* | 12/2022 | Dahl | H04R 25/305 |
| 2023/0397830 A1* | 12/2023 | Gökay | A61B 5/02416 |

FOREIGN PATENT DOCUMENTS

| | | | | |
|---|---|---|---|---|
| CH | 718868 A2 * | 2/2023 | ........... | H04R 25/305 |
| CN | 107735019 A | 2/2018 | | |
| CN | 110522437 A | 12/2019 | | |
| CN | 111067499 A | 4/2020 | | |
| DE | 102020209507 A1 | 7/2021 | | |

(Continued)

OTHER PUBLICATIONS

CH-718868-A2, English Translation (Year: 2023).*

*Primary Examiner* — Ryan D Walsh
(74) *Attorney, Agent, or Firm* — Laurence A. Greenberg; Werner H. Stemer; Ralph E. Locher

(57) ABSTRACT

A method for checking a PPG sensor of a hearing apparatus that has a rechargeable battery. A charger has a receiving space for the hearing apparatus and a testing environment for testing the functionality of the PPG sensor. The hearing apparatus is placed in the receiving space and the test environment is used to perform a function test on the PPG sensor.

17 Claims, 3 Drawing Sheets

(56) References Cited

FOREIGN PATENT DOCUMENTS

| GB | 2532745 A | 6/2016 |
| WO | 2011018086 A1 | 2/2011 |
| WO | 2020192956 A1 | 10/2020 |
| WO | 2021098694 A1 | 5/2021 |
| WO | 2021146140 A1 | 7/2021 |

* cited by examiner

METHOD FOR CHECKING A PPG SENSOR OF A HEARING APPARATUS, AND HEARING APPARATUS SYSTEM

CROSS-REFERENCE TO RELATED APPLICATION

This application claims the priority, under 35 U.S.C. § 119, of German Patent Application DE 10 2021 208 928.3, filed Aug. 13, 2021; the prior application is herewith incorporated by reference in its entirety.

FIELD AND BACKGROUND OF THE INVENTION

The invention relates to a method for checking a PPG sensor of a hearing apparatus. In addition, the invention relates to a hearing apparatus system.

Hearing apparatuses are usually used for outputting a sound signal to the ear of the wearer of the hearing apparatus. In this case, the output is provided by means of an output transducer, for the most part acoustically by means of airborne sound using a loudspeaker (also referred to as a receiver). Such hearing apparatuses are frequently used as so-called hearing aids (also: hearing devices). In this regard, the hearing apparatus normally comprises an acoustic input transducer (in particular a microphone) and a signal processor that is configured to use at least one signal processing algorithm, usually stored on a user-specific basis, to process the input signal (also: microphone signal) produced by the input transducer from the ambient sound such that a hearing loss of the wearer of the hearing apparatus is at least partially compensated for. In particular in the case of a hearing aid, the output transducer may be not only a loudspeaker but also, alternatively, what is known as a bone conduction receiver or a cochlear implant, which are configured to mechanically or electrically couple the sound signal into the ear of the wearer. The term hearing apparatuses additionally in particular also covers devices such as what are known as tinnitus maskers, headsets, headphones and the like.

Similar to the ever more widespread use of functions of so-called "wearables," for example in the form of fitness armbands, "smartwatches" and the like, which, inter alia, measure body functions (for example pulse, movement and the like) by means of sensors, the use of such functions is also being introduced into the field of hearing apparatuses. By way of example, the intention is to measure body temperature, pulse or the like. Such additional use of hearing apparatuses is possible since, particularly in the case of hearing aids, hearing apparatuses are also usually worn close to the body and frequently also over a comparatively long period of time, or even constantly.

To measure the pulse, so-called photoplethysmography sensors ("PPG sensors") are also used—in addition to the use of the known chest straps, which detect electrical signals from the heart muscle contractions. The measurement principle of such a PPG sensor is based on irradiating body tissue with light from one or more predefined wavelength ranges (for example different bands of the near infrared range and/or of the visible wavelength range) and detecting reflected or transmitted radiation and using it to determine tissue properties, in particular the present blood circulation. The amount of light detected in this case obviously influences the evaluation and determination of the tissue properties. Since hearing apparatuses, in particular hearing aids, are usually worn on or even in the ear, they are also recognized to be exposed to body fluids, for example sweat and/or cerumen, which can lead to impairment of the function of the PPG sensor.

SUMMARY OF THE INVENTION

The invention is based on the object of being able to monitor the function of a hearing apparatus better.

With the above and other objects in view there is provided, in accordance with the invention, a method of checking a PPG sensor (photo-plethysmography sensor) of a hearing apparatus that has a rechargeable battery. The method comprises:

providing a charger with a receiving space for the hearing apparatus, the charger having a test environment for the PPG sensor;
positioning the hearing apparatus in the receiving space; and
using the test environment to perform a function test on the PPG sensor.

The method according to the invention is used for checking, in particular checking the functionality of, a PPG sensor of a hearing apparatus that comprises a rechargeable battery. According to the method, a charger having a receiving space for the hearing apparatus is provided in this instance. The charger is preferably embodied as a sealable box, and so the receiving space with the hearing apparatus arranged therein is sealed during the intended charging mode. The charger additionally comprises a test environment for the PPG sensor. The hearing apparatus is positioned in this receiving space and the test environment is subsequently used to perform a function test on the PPG sensor.

The charger with the test environment thus advantageously provides at least approximately repeatable—and sufficiently robust, at least for the purpose of the method described here and below—and thus comparable ambient conditions for the hearing apparatus. This facilitates the function check or even makes it possible to start with.

In a preferred method variant, a report concerning the functionality of the PPG sensor is output to a user of the hearing apparatus at least when a result of the function test falls short of a predefined limit value. In this case, the user is in particular issued with a warning that the PPG sensor is not functioning correctly (anymore). Since the functionality of the PPG sensor in a hearing apparatus frequently occurs on account of the PPG sensor's being soiled with body fluids, in particular on account of an at least partial blockage of a beam path between a light source and a photodetector of the PPG sensor, a recommendation to clean the PPG sensor is optionally also output in addition to the warning.

In an optional method variant, the function test involves using a wall of the receiving space as a reflection surface for the PPG sensor. In particular, the hearing apparatus performs the function test as a self-test in this case. To this end, the hearing apparatus preferably comprises a controller that is configured (in particular by way of programming or circuitry) to perform this self-test independently. In particular, the PPG sensor uses its light source to transmit a test signal, uses its photodetector to detect a reflection signal (in particular occurring on account of a reflection of the test signal at the wall) and then rates the functionality of the PPG sensor. The wall of the receiving space preferably has predefined reflection properties. By way of example, the wall has a reflective surface in order to bring about as little optical attenuation (and/or scatter) of the test signal as possible. Equally, a white (optionally shiny) and/or matt matte surface is also conceivable, however. Optionally, it is conceivable for the reflection properties to be transferred to the hearing apparatus by the charger (for example as part of a type of pairing) when the hearing apparatus is inserted into the receiving space.

For the purpose of evaluation, the amount of light transmitted as part of the test signal in the method variant described above is compared with the amount of light ascertained for the reflection signal and also in particular with a limit value. If the transmitted amount of light and the detected amount of light are too far apart (that is to say for example if a difference between these two amounts of light falls short of the aforementioned limit value), this is rated as limited functionality and the aforementioned warning is preferably output.

In an expedient embodiment, the test environment for the PPG sensor comprises a test light source. In a particularly expedient method variant, the function test involves illuminating the PPG sensor by means of the test light source and comparing a measure that the PPG sensor then outputs for a detected amount of light with a corresponding measure of the amount of light emitted by the test light source. This allows the function of the PPG sensor, in particular the photodetector thereof, to be checked independently of the light source of the PPG sensor. The reason is that it may be assumed that there is a sufficiently high probability of the test light source not degrading or degrading much more slowly compared to the PPG sensor (in particular hardly being exposed to soiling), which means that an unexpectedly small detected amount of light indicates a functional limitation in the PPG sensor.

The test light source used is preferably a test light source of the same type as the light source of the PPG sensor, preferably emitting the same or an at least sufficiently similar light spectrum.

In a particularly expedient development, the test light source is actuated using a predefined value of an electrical control variable, in particular a current, to illuminate the PPG sensor. This control variable is used in particular as a measure of the emitted amount of light. The measure used for the detected amount of light in this case is preferably a photocurrent of the photodetector, which is formed by one or more photodiodes, for example. The "photocurrent" is in particular the current that is output by the photodetector in response to incident light. Optionally, the values (or at least one) of these two measures or variables are normalized for the purpose of better comparability.

In a further expedient embodiment, the test environment for the PPG sensor includes a test photodetector. The function test expediently involves the PPG sensor illuminating, in particular by means of its light source, this test photodetector. A measure that the test photodetector then outputs for a detected amount of light is compared with a corresponding measure of the amount of light (or the control variable for the light source of the PPG sensor) emitted by the PPG sensor.

The test photodetector specifically used is preferably a photodetector of the same type as the photodetector of the PPG sensor.

In an expedient development, the PPG sensor, in particular the light source thereof, is actuated using a predefined value of an electrical control variable, in particular a current, to illuminate the test photodetector. This control variable is used as a measure of the emitted amount of light. Accordingly, in particular the photocurrent described above (here as the "test photocurrent") is used as a measure of the amount of light detected by means of the test photodetector in this case. Optionally, the values (or at least one) of these two measures or variables are normalized for the purpose of better comparability.

In a particularly expedient development, the test environment comprises both the test light source and the test photodetector. In this case, the light source of the PPG sensor illuminates the test photodetector and the test light source illuminates the photodetector of the PPG sensor. This advantageously allows the function of the photodetector and that of the light source to each be checked independently of one another—at least on the assumption that both the test light source and the test photodetector are functional.

Optionally, the receiving space in the above case is radiation-absorbent, for example matte black, in order to prevent the light emitted by the light source of the PPG sensor from being reflected onto its "own" photodetector. Alternatively or additionally, the respective illumination takes place at staggered times in order to avoid influencing the other photodetector in each case.

In a further expedient method variant, a preliminary test for the function test involves using the PPG sensor and/or the test photodetector to ascertain a brightness measured variable as a measure of a distance between the PPG sensor and the test photodetector and/or the test light source. In this case, the function test is preferably performed only when the brightness measured variable satisfies a predefined criterion. If the test environment includes only the test light source, the brightness measured variable is ascertained by means of the PPG sensor, that is to say in particular the photodetector thereof. If the test environment includes only the test photodetector, the PPG sensor, in particular the light source thereof, is used to illuminate the test photodetector. If the test environment includes both the test light source and the test photodetector, two brightness measured variables are optionally ascertained and compared with one another, optionally averaged.

The method variant described above is expedient in particular if the hearing apparatus used is hearing aids, optionally hearing aids having loudspeaker units to be worn in the auditory canal that carry the PPG sensor. In this case, this loudspeaker unit is frequently not repeatably arrangeable in the receiving space to the same degree as a comparatively larger hearing apparatus body. The brightness measured variable, in particular the indication derivable therefrom for the distance between the PPG sensor and the corresponding test unit, thus allows a check to determine whether the arrangement of the hearing apparatus, optionally of the loudspeaker unit, is adequate for performing the function test in the present case. Should the brightness measured variable fail to satisfy the criterion, in particular the value thereof fall short of a limit value that forms the criterion, then an indication that the hearing apparatus should be inserted into the receiving space again or differently is output to the user, for example.

In a preferred method variant, the measures and measured variables described above, that is to say specifically the measure of the detected amount of light, the measure of the emitted amount of light and/or the brightness measured variable, are transferred from the hearing apparatus to the charger for comparison with the particular corresponding measure or with the predefined criterion. The charger preferably compares these measures and measured variables by means of a controller, which in turn is configured to perform the comparisons and evaluations described above, in particular also to actuate and/or read the test means, with the particular corresponding measure or criterion. To put it another way, the evaluation of the function test by the charger is performed by means of an appropriate controller.

Alternatively, the evaluation may also be performed by the hearing apparatus, preferably by means of an appropriately configured and designed controller.

The hearing apparatus system according to the invention comprises a hearing apparatus that includes a PPG sensor and a rechargeable battery, and also a charger that includes a receiving space for the hearing apparatus and a test environment for the PPG sensor. In addition, the hearing apparatus system comprises at least one controller that is configured to perform the method described above, preferably independently, optionally in interaction with the user. The hearing apparatus and the charger are preferably the particular devices described above within the context of the method. The controller is part of the hearing apparatus or of the charger. The two preferably each have a controller, which are optionally configured to undertake at least a particular part of the function test. By way of example, the controller of the hearing apparatus is configured to convert, for example condition, the signals of the PPG sensor and to output them for transfer to the charger.

The hearing apparatus system therefore comprises all of the advantageous developments resulting from the description above, including the resultant physical features, for example the test light source and/or the test photodetector—in equal measure in applicable optional developments. The resultant advantages thus also apply to the hearing apparatus system.

The conjunction "and/or" is intended to be understood here and below in particular such that the features linked by means of this conjunction may be embodied either together or as alternatives to one another. Similarly, the expression "at least one of X or Y" covers X alone, Y alone, or X and Y together.

An additional variant or an invention that is separate from the method described above is the method described in the following.

In other words, with the above and other objects in view there is also provided, in accordance with the invention, a method for checking a temperature sensor of a hearing apparatus that comprises a rechargeable battery, wherein according to the method a charger having a receiving space for the hearing apparatus is provided, the charger comprising a test temperature sensor,
 the hearing apparatus is positioned in the receiving space,
 the temperature sensor (of the hearing apparatus) and the test temperature sensor are each used to measure a temperature measured variable,
 the values of the two temperature measured variables are compared with one another, and
 a difference between the values of the two temperature measured variables is taken as a basis for taking a further step.

In accordance with an added feature of this variant, the two temperature measured variables (in particular the values thereof) are transferred between the hearing apparatus and the charger. The temperature measured variable of the hearing apparatus is preferably transferred to the charger.

In accordance with an additional feature of the variant, the further step is that the temperature sensor of the hearing apparatus (in particular expressed in general terms) is calibrated (or referenced) to the value of the test temperature sensor. To put it another way, that is to say that the temperature sensor of the hearing apparatus is in particular set to the value of the test temperature sensor. This is done on the assumption that the test temperature sensor is subject to lower demands that could adversely affect the measurement, and it therefore ought to deliver "more reliable" values compared to the temperature sensor.

In accordance with a further feature of the invention, temperature stabilization in the receiving space is awaited based on a trend in at least one of the values of the temperature measured variables over time. In particular, that is to say that it is waited until the values of the applicable (test) temperature sensor do not change anymore (or change only to a negligible extent), that is to say that there is thus a steady (i.e. stable, preferably static) thermal state in the receiving space.

In accordance with another variant, wherein the temperature sensor used in the hearing apparatus is a resistive temperature sensor or an infrared temperature sensor and the test temperature sensor used is accordingly conversely an infrared temperature sensor or a resistive temperature sensor. In particular, the infrared temperature sensor used is the photodetector of the PPG sensor described above, which is advantageously sensitive to infrared radiation.

Furthermore, the infrared temperature sensor is arranged in such a way that the applicable temperature measured variable is measured at the measurement location of the resistive temperature sensor. In particular, the receiving space is laid out in such a way that when the hearing apparatus is positioned in the receiving space as intended, the temperature sensor and the test temperature sensor are arranged in juxtaposition. Optionally, the receiving space is also designed in such a way that the hearing apparatus can be positioned in the receiving space only in one spatial orientation. This arrangement of the infrared temperature sensor allows the latter—in particular because it is able to record the temperature over an open distance of up to a few (for example 2 to 5) millimeters—to advantageously record the temperature at the same location as the resistive temperature sensor.

In accordance with a concomitant feature of the invention, and particularly as a further development of the two preceding features, there is provided a further step in that a response behavior of the temperature sensor for a temperature change is modelled on the basis of the trend in the value of its temperature measured variable and in the value of the test temperature sensor, in particular using the test temperature sensor in the form of an infrared temperature sensor, over time.

Other features which are considered as characteristic for the invention are set forth in the appended claims.

Although the invention is illustrated and described herein as being embodied in a method for checking a PPG sensor of a hearing apparatus, and hearing apparatus system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE FIGURES

Mutually corresponding parts and variables are provided with identical reference signs throughout the figures.

DETAILED DESCRIPTION OF THE INVENTION

Figure 1:
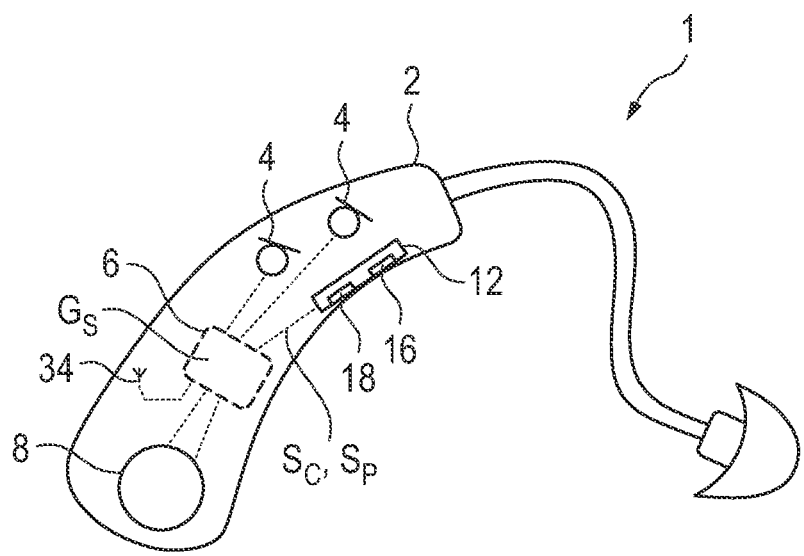
FIG. 1 shows a schematic side view of a hearing apparatus.

Referring now to the figures of the drawing in detail and first, in particular, to FIG. 1 thereof, there is shown a hearing apparatus in the form of a hearing aid, specifically a hearing aid to be worn behind the ear of a user (also referred to as a hearing device, here as "BTE 1", for short). The BTE 1 includes a housing 2 in which electronic components of the BTE 1 are arranged. These electronic components are for example two microphones 4, a signal processor 6 and a battery module 8, which in turn includes a rechargeable battery. When the BTE 1 is operating as intended, the microphones 4 are used to receive ambient sound and to convert said sound into electrical input signals (also: "microphone signals"), which are processed (in particular filtered, amplified on a frequency-dependent basis and/or attenuated, etc.) by the signal processor 6 (also referred to as "controller"). The processed input signals are subsequently output as output signals to a loudspeaker, not shown, and are converted into sound signals by the latter and forwarded to the ear of the user.

The BTE 1 additionally comprises a photoplethysmography sensor, "PPG sensor 12" for short, which is likewise inserted in the housing 2 in the present exemplary embodiment. The PPG sensor 12 is used for example to ascertain the pulse, optionally also the oxygen saturation, of the user of the BTE 1. To this end, the PPG sensor 12 includes a light source, in the present case an LED unit 16, which is configured to output light in multiple frequency bands, but usually at least light in the near infrared range. Additionally, the PPG sensor 12 comprises a light sensor 18 ("photodetector") by means of which radiated light is detected. When operating as intended, the light sensor 18 detects radiation that is output by the LED unit 16 and reflected by body tissue, for example a vascular wall of a blood vessel of the user. The intensity profile detected in the process can then be used to determine the pulse of the user, for example.

Figure 2:
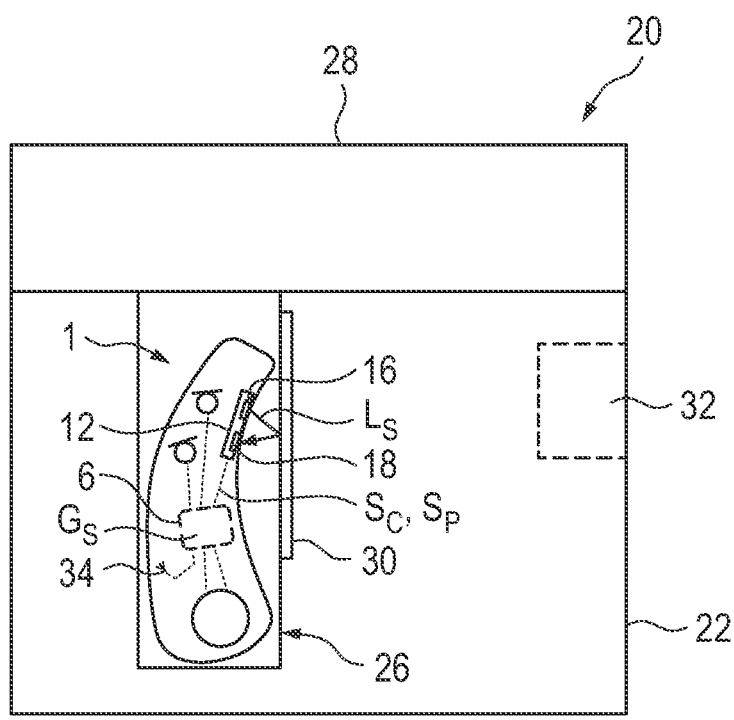
FIG. 2 shows a schematic side view of a hearing apparatus system that includes the hearing apparatus shown in FIG. 1 and a charger.

FIG. 2 shows a hearing apparatus system 20 in more detail. Said system includes the BTE 1 described above and a charger 22. The latter is used to recharge the rechargeable battery of the BTE 1. To this end, the charger 22 comprises a receiving space 26 in which the BTE 1 is positioned in the intended charging state (see FIG. 2). The charger 22 provides a test environment for the BTE 1, specifically for the PPG sensor 12 thereof. Additionally, the charger 22 has a lid 28 by means of which the receiving space 26 is sealable.

An example of a method for checking the function of the PPG sensor 12 is described in more detail below with reference to FIG. 2. In this scenario, the BTE 1, specifically using the signal processor 6 thereof, performs a self-test on the PPG sensor 12. In the example shown in FIG. 2, the test environment is used to provide preferably repeatable and stable conditions for the self-test on the PPG sensor 12. To this end, a wall of the receiving space 26 is equipped with a reflective surface 30 of predefined "quality" when the BTE 1 is in the intended state of insertion in the receiving space 26. By way of example, this surface 30 is white, but not shiny, in order to allow light to be scattered in preferably all directions ("diffuse scatter/reflection"). During the self-test, the signal processor 6 actuates the PPG sensor 12 in order to use the LED unit 16 to output a light signal ("test signal") $L_S$ having a predefined amount of light (or: radiation intensity). The light sensor 18 is used to detect at least a portion of the light signal $L_S$ that is reflected from the surface 30. The measure used for the detected amount of light is a photocurrent $S_P$ that is then output by the light sensor 18. The value of said photocurrent is compared with a measure of the emitted amount of light, here specifically a control variable, in particular a control current $S_C$, by means of which the LED unit 15 is actuated. If the value of the photocurrent $S_P$ exceeds a limit value $G_S$, which is predefined on the basis of the nature of the surface 30, it may be assumed that the PPG sensor 12 is functional. If this limit value $G_S$ is fallen short of, or undershot, the signal processor 6 outputs a report to the user of the BTE 1. In this report, the signal processor 6 indicates to the user that the PPG sensor 12 is not functioning as intended. For example, it may be soiled.

Optionally, the comparison with the limit value $G_S$ takes place in a controller 32 of the charger 22. In this case, the signal processor transmits the value of the control current $S_C$ and of the photocurrent $S_P$ to the controller 32 of the charger 22 by means of a transmitter 34.

Figure 3:
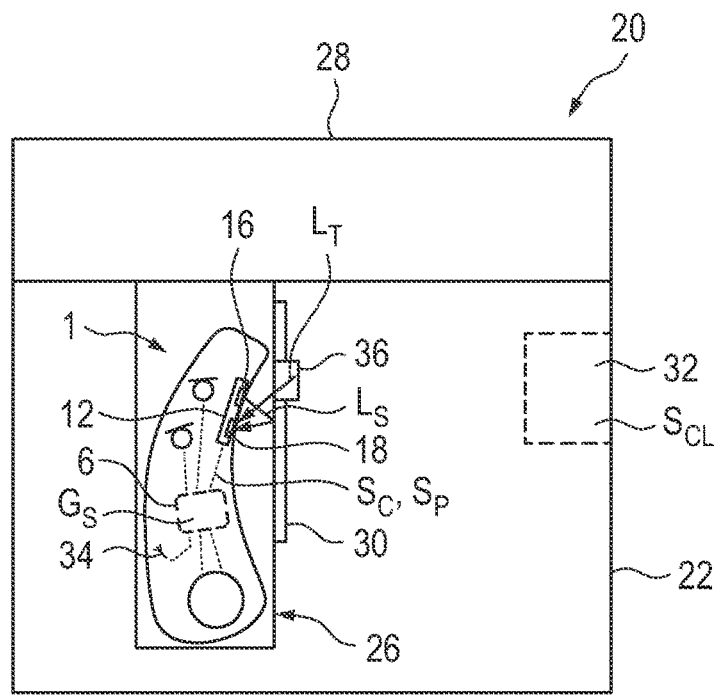
FIGS. 3-5 each shows a view similar to FIG. 2 for a further exemplary embodiment of the hearing apparatus system.

FIG. 3 describes an alternative exemplary embodiment of the hearing apparatus system 20 and of the method for checking the function of the PPG sensor 12 that is performed by means of said system. Besides the surface 30 described above, the charger 22 also has a test light source 36. This is of the same type, specifically the same design, as the LED unit 16 of the PPG sensor 12 and is thus able to emit light of the same wavelength(s). Additionally, the test light source 36 is positioned in the receiving space 26 in such a way that it is arranged in juxtaposition with the PPG sensor 12 when the BTE 1 is positioned as intended.

In addition or as an alternative to the approach described above, this test light source 36 is optionally used to test the light sensor 18 separately during the function check. To this end, the charger 22 uses the test light source 36 to emit a test light signal $L_T$ in the direction of the PPG sensor 12. If said signal is detected by means of the light sensor 18, the BTE 1 sends the ascertained photocurrent $S_P$ to the controller 32 of the charger 22. Said controller compares the photocurrent $S_P$ (the value thereof) with its own control current $S_{CL}$ (specifically the value thereof) output to the test light source 36. If the values of the two variables are sufficiently similar, the controller 32 infers that the light sensor 18 is functional. Otherwise, the controller 32 outputs a warning. If the self-test described above is subsequently performed when the light sensor 18 is functional, and the limit value $G_S$ is fallen short of in the process, this indicates a malfunction in the LED unit 16. An appropriate warning is then output.

Figure 4:
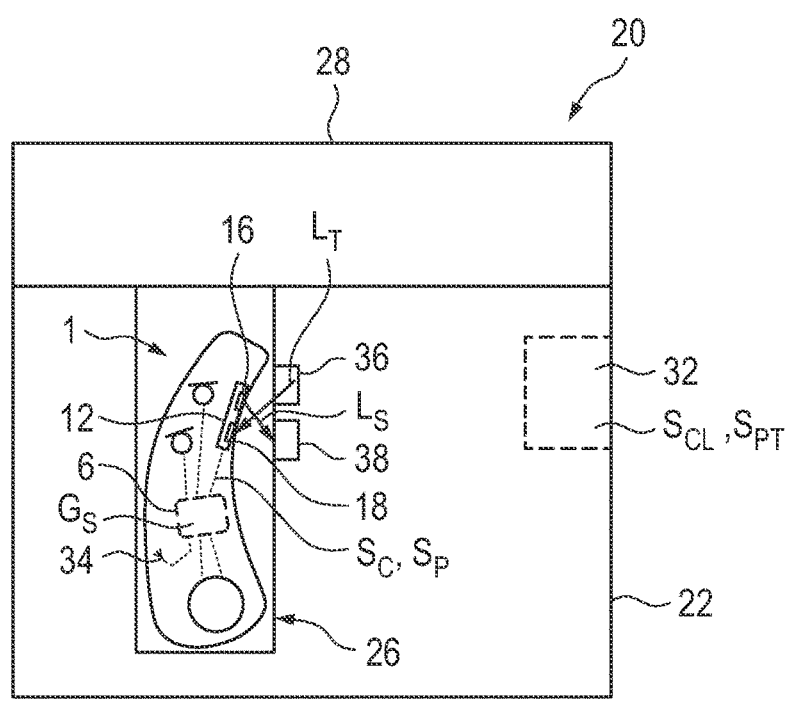

FIG. 4 describes an alternative exemplary embodiment of the hearing apparatus system 20 and of the method for checking the function of the PPG sensor 12 that is performed by means of said system. Besides the test light source 36 described above for FIG. 3, the charger 22 also comprises a test photodetector (referred to as "test light sensor 38" here). This is of the same type, specifically the same design, as the light sensor 18 of the PPG sensor 12 and thus has the same detection characteristic. The test light sensor 38 is also positioned in the receiving space 26 in such a way that it is arranged in juxtaposition with the PPG sensor 12 when the BTE 1 is positioned as intended.

In addition to the approach described with reference to FIG. 3, the function check involves the light signal $L_S$ being transmitted by the LED unit 16 and at least portions of said light signal being received by means of the test light sensor 38. A corresponding test photocurrent $S_{PT}$ is compared by the controller 32 with the control current $S_C$ for the LED unit 16, which current was transmitted to the controller 32 by the BTE 1. That is to say that it is thus possible to check the function of the LED unit 16 and of the light sensor 18 independently of one another.

In an optional variant, the controller 32 is configured to perform a self-test for the test light source 36 and the test light sensor 38 by operating them similarly to the PPG sensor, for example when the BTE 1 is not inserted. In this case, the procedure is similar to that for the self-test described with reference to FIG. 2.

Optionally, multiple test light sources 36 are arranged in the receiving space 26. In order to ascertain which test light source 36 the PPG sensor 12 is arranged opposite "best", i.e. specifically closest, the individual test light sources 36 are actuated in succession and the particular detected intensity is detected. The test light source 36 that brings about the "strongest" reaction is assumed to be the closest.

Figure 5:
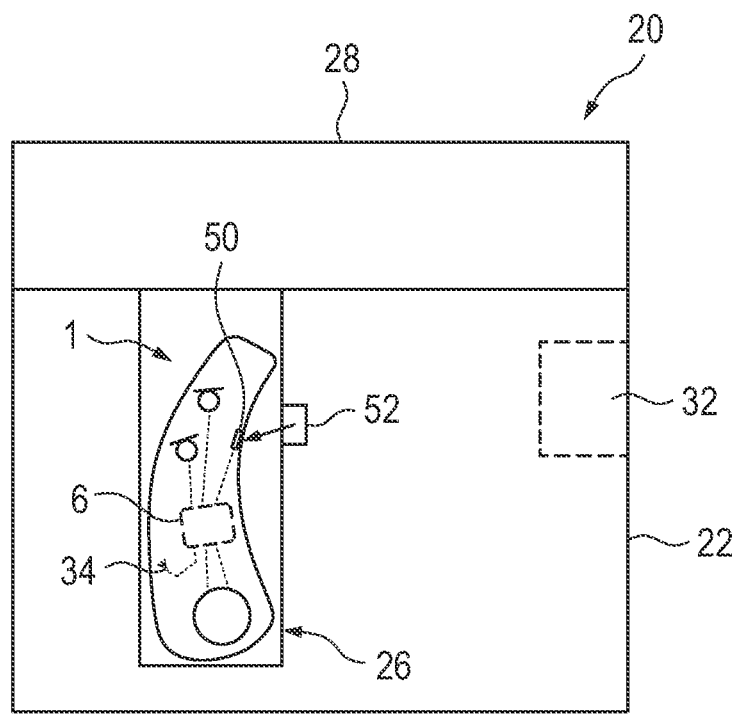

FIG. 5 shows a further exemplary embodiment of the hearing apparatus system 20. The BTE 1 in this case comprises a temperature sensor 50 that is in the form of a resistive temperature sensor. Said sensor is used to ascertain the body temperature of the user of the BTE 1 in the intended worn state. The charger 22 comprises an infrared temperature sensor, IR sensor for short, 52. As described above for the test light source 36, said sensor is likewise arranged in juxtaposition with the temperature sensor 50. After the BTE 1 has been inserted into the charger 22, specifically into the receiving space 26, the IR sensor 52 is used to record the temperature at the location of the temperature sensor 50. After an adjustment time, the end of which is identified from the fact that the measured temperature values do not change again, the temperature values measured by means of the temperature sensor 50 and the IR sensor 52 are compared with one another. If they differ from one another, the temperature sensor 50 is set to the value of the IR sensor 52, and therefore is "calibrated" to said value.

The subject matter of the invention is not restricted to the exemplary embodiments described above. Rather, further embodiments of the invention may be derived from the above description by a person skilled in the art. In particular, the individual features of the invention, and the configuration variants thereof, as described with reference to the various exemplary embodiments, may also be combined with one another in some other way.

The following is a summary list of reference numerals and the corresponding structure used in the above description of the invention:

1 BTE
2 housing
4 microphone
6 signal processor
8 battery module
12 PPG sensor (photoplethysmography sensor)
16 LED unit
18 light sensor
20 hearing apparatus system
22 charger
26 receiving space
28 lid
30 surface
32 controller
34 transmitter
36 test light source
38 test light sensor
50 temperature sensor
52 IR sensor
$L_S$ light signal
$L_T$ test light signal
$S_C$ control current
$S_P$ photocurrent
$G_S$ limit value
$S_{CL}$ control current
$S_{PT}$ test photocurrent

The invention claimed is:

1. A method of checking a photoplethysmography (PPG) sensor of a hearing apparatus that has a rechargeable battery, the method which comprises:
   providing a charger with a receiving space for the hearing apparatus, the charger having a test environment for the PPG sensor;
   positioning the hearing apparatus in the receiving space; and
   using the test environment to perform a function test on the PPG sensor;
      wherein the test environment for the PPG sensor includes a test light source and the function test comprises illuminating the PPG sensor by the test light source, receiving a measure output by the PPG sensor for a detected amount of light, and comparing the measure output by the PPG sensor with a corresponding measure of an amount of light emitted by the test light source; and
      wherein the test environment for the PPG sensor includes a test photo-detector and the function test comprises illuminating the test photodetector by the PPG sensor and comparing a measure output by the test photodetector for a detected amount of light with a corresponding measure of an amount of light emitted by the PPG sensor; and
   performing a preliminary test for the function test by using the PPG sensor and/or the test photodetector to ascertain a brightness measured variable as a measure of a distance between the PPG sensor and the test photodetector and/or the test light source.

2. The method according to claim 1, which further comprises outputting a report concerning a functionality of the PPG sensor to a user of the hearing apparatus when a result of the function test falls short of a predefined limit value.

3. The method according to claim 1, wherein the function test comprises using a wall of the receiving space as a reflection surface for the PPG sensor.

4. The method according to claim 1, wherein the test light source is of a same type light source as a light source of the PPG sensor.

5. The method according to claim 1, which comprises actuating the test light source using a predefined value of an electrical control variable to illuminate the PPG sensor, and using the control variable as a measure of an emitted amount of light.

6. The method according to claim 5, wherein the electrical control variable is an electric current.

7. The method according to claim 1, wherein the test photodetector is of a same type as a photodetector of the PPG sensor.

8. The method according to claim 1, which comprises actuating the PPG sensor using a predefined value of an electrical control variable to illuminate the test photodetector and using the control variable as a measure of the emitted amount of light.

9. The method according to claim 8, wherein the step of actuating the PPG sensor comprises actuating a light source of the PPG sensor.

10. The method according to claim 1, which comprises performing the function test only when the brightness measured variable satisfies a predefined criterion.

11. The method according to claim 1, which comprises transferring the measure of the detected amount of light, the measure of the emitted amount of light, and/or the brightness measured variable from the hearing apparatus to the charger for comparison with a particular corresponding measure or with a predefined criterion and comparing with a particular corresponding measure or criterion by the charger by way of a controller configured for that purpose.

12. A hearing apparatus system, comprising:
a hearing apparatus with a photoplethysmography (PPG) sensor and a rechargeable battery; and
a charger formed with a receiving space for said hearing apparatus and a test environment for testing said PPG sensor; and
at least one controller configured to perform the method according to claim 1.

13. A method of checking a photoplethysmography (PPG) sensor of a hearing apparatus that has a rechargeable battery, the method which comprises:
providing a charger with a receiving space for the hearing apparatus, the charger having a test environment for the PPG sensor;
positioning the hearing apparatus in the receiving space;
using the test environment to perform a function test on the PPG sensor;
wherein the test environment for the PPG sensor includes a test light source and the function test comprises illuminating the PPG sensor by the test light source, receiving a measure output by the PPG sensor for a detected amount of light, and comparing the measure output by the PPG sensor with a corresponding measure of an amount of light emitted by the test light source; and
performing a preliminary test for the function test by using the PPG sensor to ascertain a brightness measured variable as a measure of a distance between the PPG sensor and the test light source.

14. The method according to claim 13, wherein:
the test environment for the PPG sensor includes a test light source and the function test comprises illuminating the PPG sensor by the test light source, receiving a measure output by the PPG sensor for a detected amount of light, and comparing the measure output by the PPG sensor with a corresponding measure of an amount of light emitted by the test light source; and
the test environment for the PPG sensor includes a test photo-detector and the function test comprises illuminating the test photodetector by the PPG sensor and comparing a measure output by the test photodetector for a detected amount of light with a corresponding measure of an amount of light emitted by the PPG sensor.

15. The method according to claim 13, which comprises transferring the measure of the detected amount of light, the measure of the emitted amount of light, and/or the brightness measured variable from the hearing apparatus to the charger for comparison with a particular corresponding measure or with a predefined criterion and comparing with a particular corresponding measure or criterion by the charger by way of a controller configured for that purpose.

16. A method of checking a photoplethysmography (PPG) sensor of a hearing apparatus that has a rechargeable battery, the method which comprises:
providing a charger with a receiving space for the hearing apparatus, the charger having a test environment for the PPG sensor;
positioning the hearing apparatus in the receiving space; and
using the test environment to perform a function test on the PPG sensor wherein the test environment for the PPG sensor includes a test photodetector and the function test comprises illuminating the test photodetector by the PPG sensor and comparing a measure output by the test photodetector for a detected amount of light with a corresponding measure of an amount of light emitted by the PPG sensor
performing a preliminary test for the function test by using the test photodetector to ascertain a brightness measured variable as a measure of a distance between the PPG sensor and the test photodetector.

17. The method according to claim 16, which comprises transferring the measure of the detected amount of light, the measure of the emitted amount of light, and/or the brightness measured variable from the hearing apparatus to the charger for comparison with a particular corresponding measure or with a predefined criterion and compared with a particular corresponding measure or criterion by the charger by way of a controller configured for that purpose.

* * * * *